United States Patent
Botella et al.

[11] Patent Number: 5,810,690
[45] Date of Patent: Sep. 22, 1998

[54] GEARSHIFT LEVER LOCKING DEVICE FOR AUTOMATIC TRANSMISSION VEHICLES

[76] Inventors: Octavi Lorente Botella, 5, Avenida del Parque, 08400 Granollers; Xavier Motger Graus, 44, calle Casanova, 08011 Barcelona, both of Spain

[21] Appl. No.: 732,266
[22] PCT Filed: Feb. 19, 1996
[86] PCT No.: PCT/ES96/00035
§ 371 Date: Oct. 23, 1996
§ 102(e) Date: Oct. 23, 1996
[87] PCT Pub. No.: WO96/26374
PCT Pub. Date: Aug. 29, 1996
[51] Int. Cl.⁶ .......................... F16H 59/10; F16H 61/22; B60R 25/00
[52] U.S. Cl. .............................................. 477/99
[58] Field of Search ................................. 477/99

[56] References Cited

U.S. PATENT DOCUMENTS

| | | | |
|---|---|---|---|
| 4,905,802 | 3/1990 | Gotoh . | |
| 4,959,982 | 10/1990 | Mauz et al. | 477/99 |
| 4,967,883 | 11/1990 | Kito et al. | 477/99 |
| 5,027,929 | 7/1991 | Ratke et al. | 477/99 |
| 5,031,737 | 7/1991 | Dzobia et al. . | |
| 5,085,096 | 2/1992 | Behrens . | |
| 5,197,356 | 3/1993 | Kobayashi et al. | 477/99 |
| 5,226,303 | 7/1993 | Dieden et al. | 477/99 |
| 5,490,858 | 2/1996 | Togano | 477/99 |

FOREIGN PATENT DOCUMENTS

| | | |
|---|---|---|
| 0315174A1 | 11/1988 | European Pat. Off. . |
| 0334672B1 | 3/1989 | European Pat. Off. . |
| 0580970A1 | 5/1993 | European Pat. Off. . |

*Primary Examiner*—Dirk Wright

[57] ABSTRACT

Locking device for the automatic transmission gearshift lever of automobile vehicles.

This device includes a reset mechanism (MR) and a securing mechanism (MF) linked by a control cable (C). The reset mechanism (MR) includes a contact stem (10) linked to the two-position ignition key, parking position and drive position, which correspond with the coupling of the key with the starter switch, and a retaining stem (11) linked to the cable (C). The securing mechanism (MF) includes a traction body (22) linked to the lever (2), to its support (1) and to the cable (C). When the contact (10) and retaining (11) stems are coupled, the traction body (22) locks the trigger (3) of the lever (2), preventing its actuation. Uncoupling of the ignition key requires the lever (2) to be in the parking position, the coupling of both stems (10, 11) taking place automatically.

6 Claims, 4 Drawing Sheets

GEARSHIFT LEVER LOCKING DEVICE FOR AUTOMATIC TRANSMISSION VEHICLES

TECHNICAL FIELD OF THE INVENTION

The object of the present invention is a locking device for the automatic transmission gearshift lever of automobile vehicles.

BACKGROUND OF THE INVENTION

Known in the art are many embodiments of locking devices which have the purpose, under certain circumstances, such as when the vehicle is parked, of acting upon the gearshift lever to render it impossible to drive the vehicle. Such locking devices are generally actuated by the user once the vehicle has been parked, and require that the user proceed deliberately to unlock them to make it possible to drive the vehicle.

The known embodiments of locking device such as those described present, totally or partially, the following disadvantages:

the device immobilizes the gearshift lever in any of the driving positions, that is, the gearshift lever can be locked in a position other than the parking position, which can mean that when the user unlocks the device, starting of the vehicle engine is implemented with the gearbox set up in driving conditions, thus causing a situation which is at the very least difficult;

the device is actuated manually by the user, which means that the device is actuated only in those cases when the user deems it appropriate; this leads to situations where it is possible to make undue use of the vehicle in all cases in which the device is not operative;

the device is mounted in the driving compartment and is at the very least a nuisance, while it also lends the vehicle a finish which, on a certain type of vehicles, is scarcely acceptable;

the device requires actuating items such as keys, which constitutes a clear disadvantage due to it being the usual practice to centralize vehicle systems such as door locking, steering lock, etc., in a single key, which is also the ignition key.

EXPLANATION OF THE INVENTION

An automatic transmission gear lever locking device of original structure and operation is made known hereby in order to provide a new embodiment of locking device which provides a solution to all the above-mentioned problems. The locking device of the invention presents the main advantages detailed below:

the locking device is linked with the operating or ignition key for the starter switch on the vehicle dashboard;

actuation of the locking device is automatic upon withdrawal of the ignition key, thereby immobilizing the gearshift lever and avoiding manual actuation of the device;

linking of the locking device with the ignition key means that in order to withdraw the ignition key the driver of the vehicle must move the gearshift lever to the parking position, this advantage providing a special solution to those disadvantages deriving from the operation of known embodiments of locking devices which operate independently of the position of the gearshift lever;

the locking device of the invention is so arranged as to be inaccessible from the exterior, which largely prevents it being manipulated in an undue or unauthorized manner, so that in a complementary manner it exercises the function of an effective anti-theft device.

The locking device of the invention comprises a reset device and a securing mechanism linked by a control cable made up of a sheathed steel cable, in which:

the reset device is associated with the starter switch on the vehicle dashboard through a contact stem with two working positions provided by coupling of the ignition key with the switch, a first position or parking position in which the ignition key is not coupled with the switch, and a second position or drive position in which the ignition key is coupled with the switch;

the reset device includes a main body, characterized in that: a retaining stem and a thrust spring, in which the main body houses the contact stem and the retaining stem, both of which can slide in both directions, with the retaining stem being provided with means of coupling with the contact stem and, being linked by one of its ends to the corresponding end of the steel cable of the control cable, the thrust spring acts permanently upon the retaining stem, pushing it towards the interior of the main body and tending to situate it in its most advanced position, or locking position, all this in such a way that, with the contact stem in the parking position and the retaining stem in the locking position, both stems can be coupled to prevent sliding of the retaining stem and;

the securing mechanism includes a traction body coupled to the gearshift lever and to the lever support and linked at the other end of the steel cable of the control cable, implementing coupling of the traction body with the support in such a way that the traction body can rotate in both directions around a pivot pin, the traction body being coupled with the lever in such a way that the position of the traction body corresponds with that of the lever, the locking position being distinguished in that the lever occupies the parking position, which corresponds with the locking position of the retaining stem, while in a traction body position different from the locking position the retaining stem occupies a position different from the locking position which prevents it coupling with the contact stem, the traction body being permanently submitted to the action of the thrust spring in such a way that, when the traction body is moved by the lever from the locking position to another position, it subjects the thrust spring to higher compression, while when the lever is moved to its parking position the traction body is moved towards the locking position driven by the reaction of the thrust spring and, the contact and retaining stems being coupled, the traction body is fixed in the locking position, leaving the lever set in the parking position by locking of its actuation trigger.

According to another characteristic of the locking device of the invention, the coupling of the traction body of the securing mechanism with the gearshift lever is implemented by means of a stop attached to the lever and arranged in a slot on the traction body through which it can slide.

According to another characteristic of the locking device of the invention, the traction body of the securing mechanism is adapted so that, when the gearshift lever is in the parking position, the projection from the actuation trigger of the lever linked with the retainer of the support which sets the parking position is positioned between the support and the traction body in such a way that, with the contact and retaining stems coupled, the projection of the trigger cannot be moved.

According to another characteristic of the locking device of the invention, the portion of the traction body facing the projection of the trigger of the lever, when the latter occupies the parking position, forms a certain angularity oriented towards the other positions of the lever.

According to another characteristic of the locking device of the invention, the contact and retaining stems of the retaining mechanism are arranged orthogonally to each other, their mutual coupling being implemented by means of a cavity made in the retaining stem which is so dimensioned as to receive the corresponding end portion of the contact stem.

According to another characteristic of the locking device of the invention, the thrust spring of the retaining mechanism is arranged coaxially with respect to the control cable and works permanently under compression, with one of its ends resting against a fixed point of the vehicle structure and its other end against an annular body fixed coaxially to the end of the steel cable linked to the retaining stem.

BRIEF DESCRIPTION OF THE DRAWINGS

The drawing sheets of the present specification show the locking device of the automatic transmission gearshift lever of automobile vehicles of the invention. In said drawings.

DETAILED DESCRIPTION OF THE EXAMPLE OF EMBODIMENT

Figure 1:
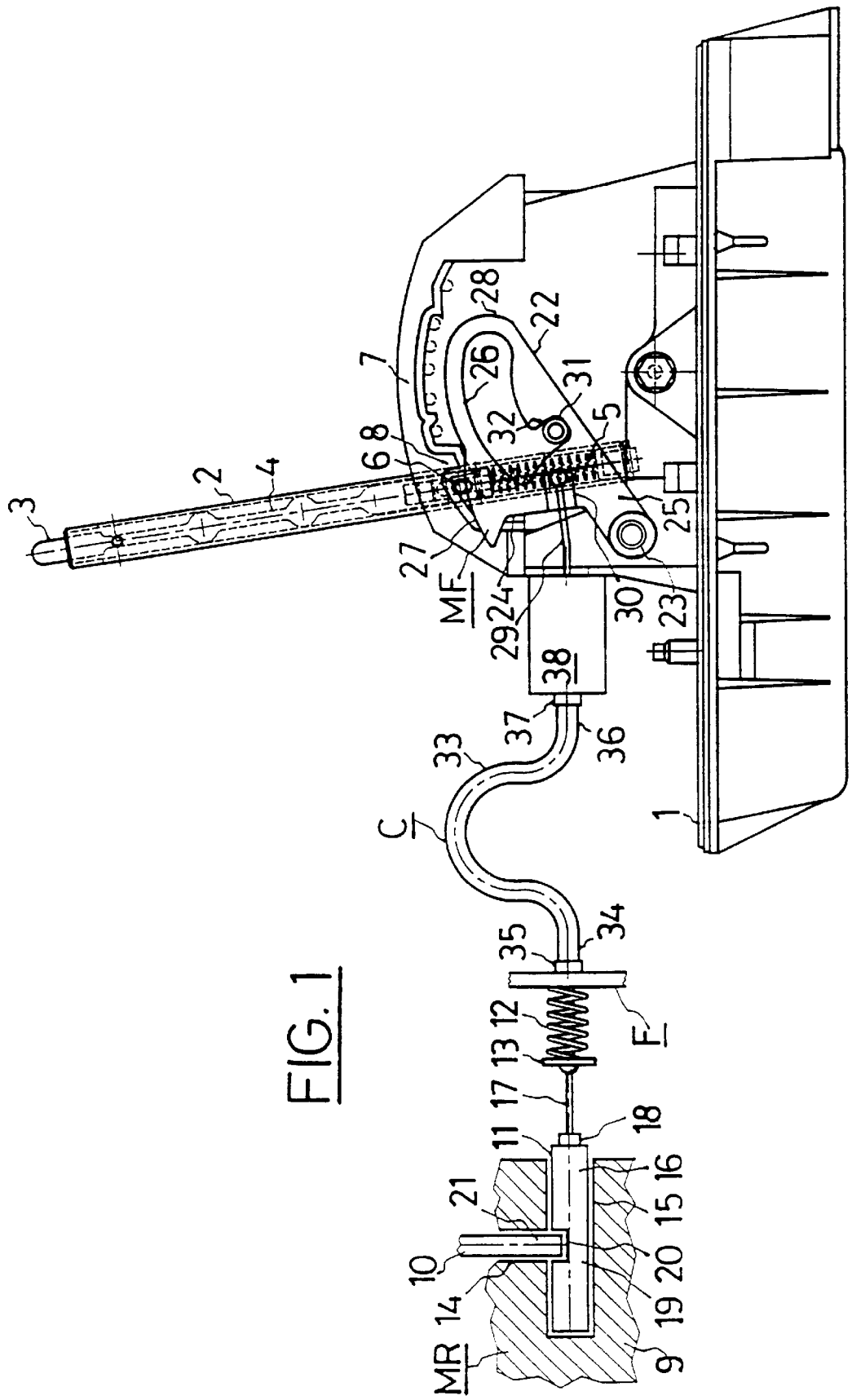
FIG. 1 is a schematic view of the device of the invention in which the gearshift lever is in the parking position locked by the action of the device.
Figure 2:
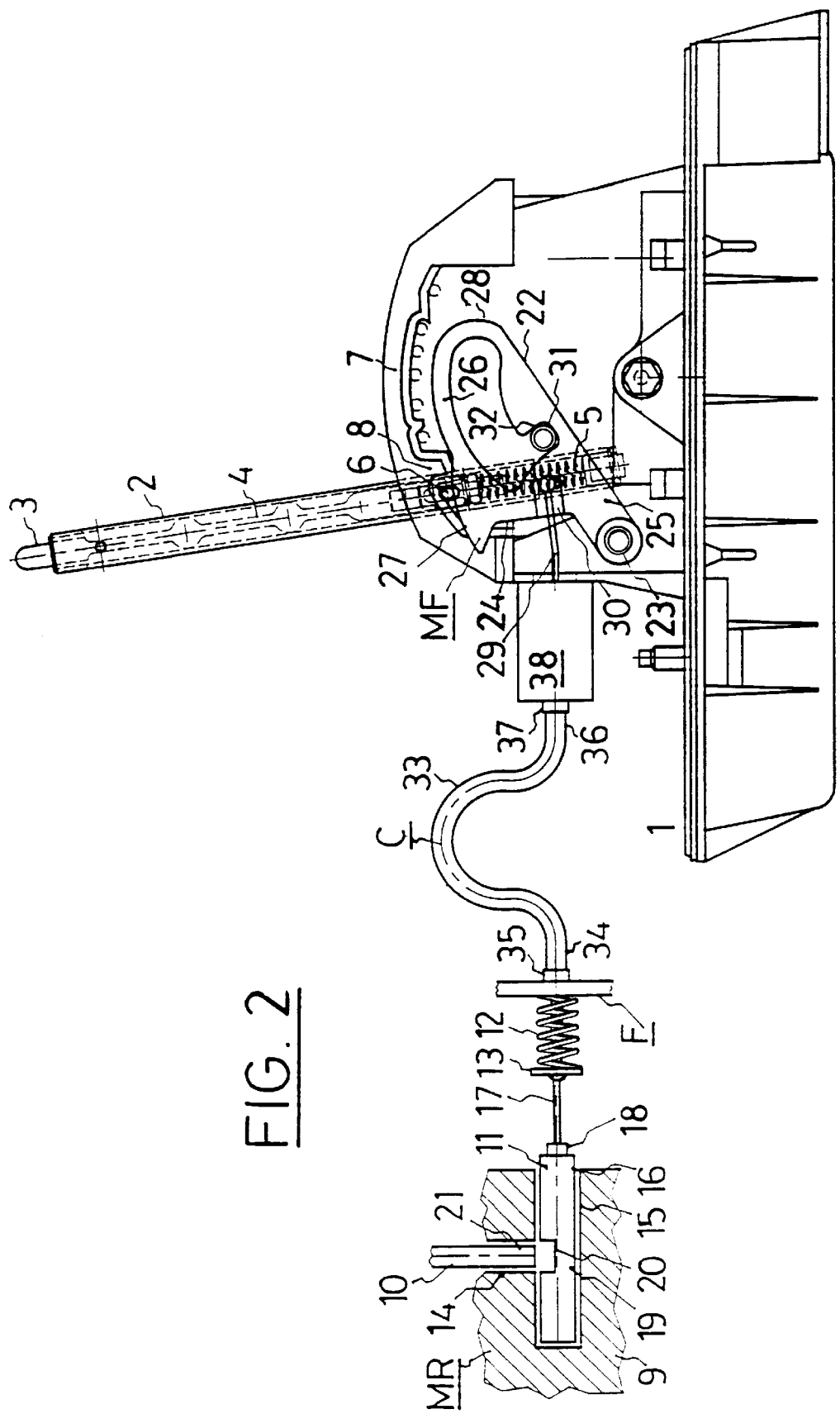
FIG. 2 is a schematic view of the device of the invention in which the lever of FIG. 1 is in the unlocked parking position.
Figure 3:
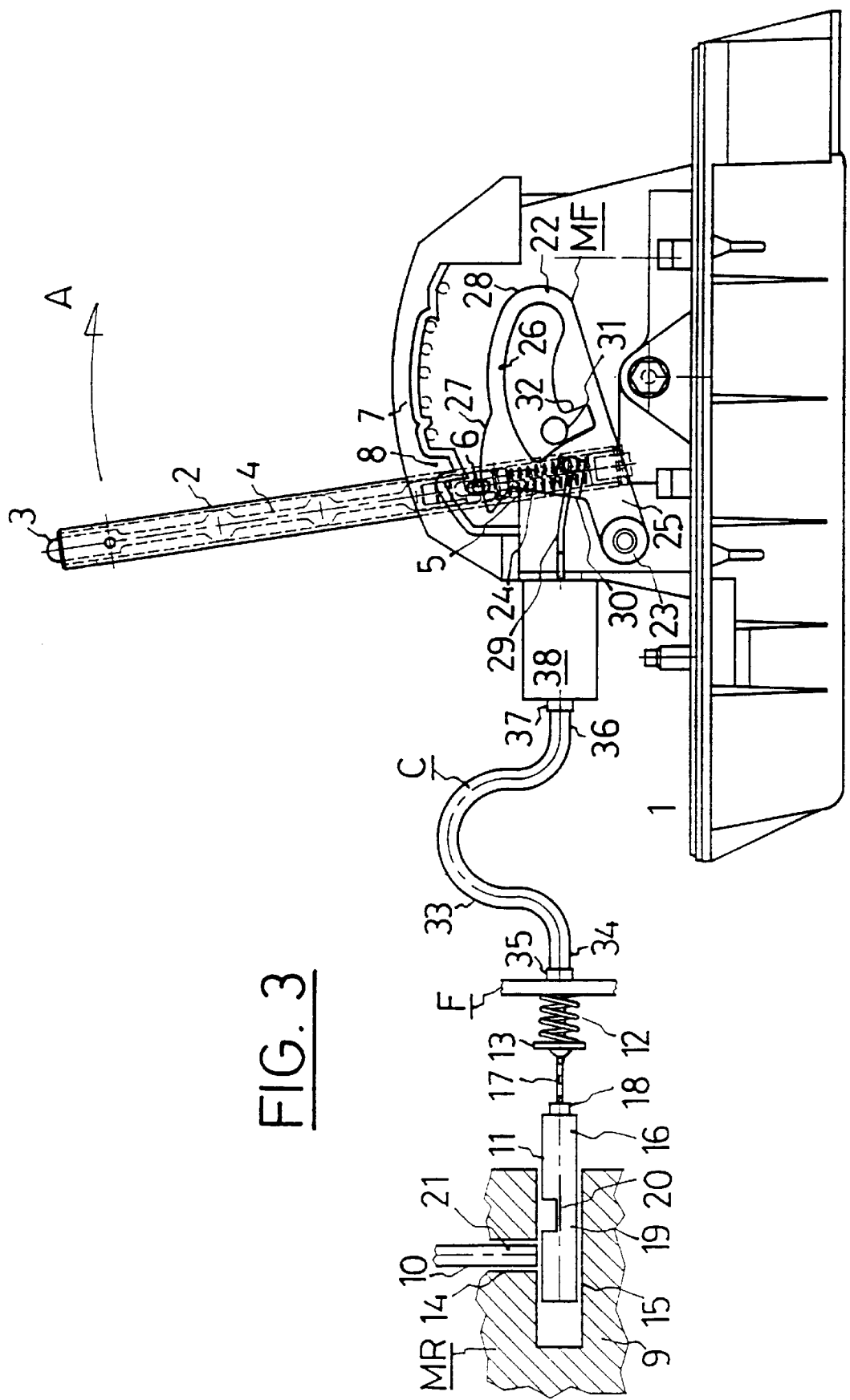
FIG. 3 is a schematic view of the device of the invention in which the trigger of the lever of FIGS. 1 and 2 is pressed prior to movement of the lever.
Figure 4:
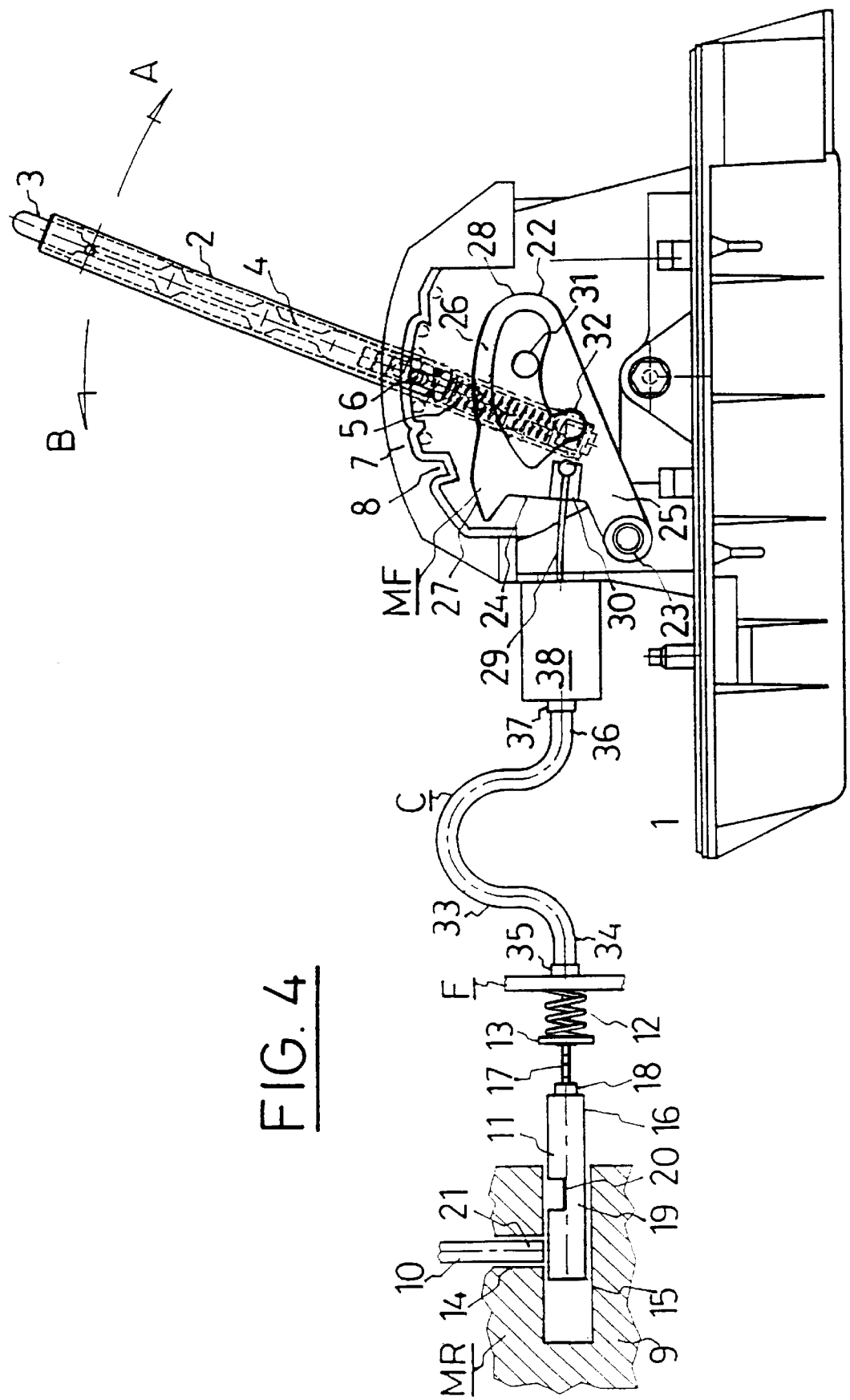
FIG. 4 is a schematic view of the device of the invention in which the lever of FIGS. 1 to 3 occupies a position different from the parking position.

The description which follows of the locking device of the automatic transmission gearshift lever of automobile vehicles of the invention refers to FIG. 1 of the drawing sheets, although the other FIGS. 2 to 4 show identical components which differ from those shown in FIG. 1 only by the different position which some of them adopt. These premises stated, the locking device of the invention includes a reset mechanism MR and a securing mechanism MF which are linked by means of a control cable C.

The reset mechanism MR is associated with the starter switch which, mounted arranged on the dashboard, is actuated by means of an ignition key. The switch and the ignition key have not been shown in the figures of the drawing sheets, since they can adopt any configuration without this affecting the essential nature of the invention.

The securing mechanism MF is fitted to a support 1 of a lever 2 of a gearbox not shown in the drawing sheets. The coupling of the lever 2 with the cable or cables which link it with the gearbox is not shown either. The support 1, which in this example of embodiment is made from an aluminium alloy casting, is set at a level immediately beneath the passenger compartment of the vehicle, with a portion of the lever 2 which can be actuated by the user projecting from that compartment. As is known, in order to actuate the lever 2 the user has to press a trigger 3 in order, through a stem 4 and overcoming the resistance of a spring 5 which works under compression, to move a projection 6 to situate it in one of the driving positions set by a bridge 7 of the support 1; it should be noted under this point that the parking position of the lever 2 is determined by a radial retainer 8.

It is understood that the support 1 and the lever 2 shown in the figures of the drawing sheets are provided only as a guideline, since both can adopt any other configuration suitable for each specific case of application without this affecting the essential nature of the invention.

The reset mechanism MR includes a main body 9, a contact stem 10, a retaining stem 11, a thrust spring 12 and an annular body 13.

The main body 9 is coupled to the starter switch, even forming part of same, and includes two orifices 14, 15 whose respective axes are set orthogonally and in coplanar fashion to form a generally T-shaped cavity. The contact stem 10 can slide in both directions through the orifice marked number 14, while the retaining stem 11 can slide in both directions through the orifice marked number 15.

The contact stem 10 is linked to the ignition key in such a way that, if the ignition key is not coupled to the starter switch, the contact stem 10 takes up the position shown in FIG. 1, which is the parking position, and when the ignition key is coupled to the starter switch the contact stem 10 takes up the driving position shown in FIGS. 2 to 4. Said linkage of the contact stem 10 with the ignition key of the switch has not been shown, and it can adopt any suitable configuration without this affecting the essential nature of the invention.

The end 16 of the retaining stem 11 projects from the main body 9 and is firmly attached to a corresponding end 17 of the steel cable of the control cable C by means of a retaining collar 18. On its central portion 19, the retaining stem 11 has a cavity 20 so dimensioned that, when it is in its most advanced position or locking position, it receives with a tight fit the interior end 21 of the contact stem 10 when the latter is in its most interior position, that is, in the parking position.

The thrust spring 12 is set coaxially with respect to the end 17 of the steel cable of the control cable C and works permanently under compression with one of its ends resting against a fixed point F of the structure of the automobile vehicle, and its other end against the annular body 13 firmly attached to said end 17; in this way, the thrust spring 12 tends permanently to situate the retaining stem 11 inside the main body 9 in its most advanced position or locking position.

The securing mechanism MF includes a traction body 22 which is fixed to the support 1 by means of a pivot pin 23 which allows it to rotate in both directions. In this example of embodiment of the traction body 22, the latter adopts a planar configuration of basically long trapezoidal shape in which one of its sides 24 is linked by means of an extension 25 to the pivot pin 23, while its shorter base 26 has a convex outline which corresponds with the outline of the bridge 7 of the support 1, the shorter base 26 having a plane 27 which projects and forms a certain angularity oriented towards the other side 28 of the traction body 22.

The traction body 22 is linked to the other end 29 of the steel cable of the control cable C by means of a retaining collar 30, so that the traction body 22 is permanently submitted to the action of the thrust spring 12 which tends to situate it in the locked position shown in FIGS. 1 and 2.

The rotation of the traction body 22 around the pivot pin 23 is caused, in one of the directions, that marked as A in FIGS. 3 and 4, by the lever 2 through a stop 31 attached to the lever 2 and located in a slot 32 of the traction body 22, and in t he other opposite direction, marked as B in FIG. 4, it is caused by the action of the thrust spring 12.

The sheath 33 of the control cable C has one of its ends 34 fixed by means of a retaining collar 35 to the fixed point F, while its other end 36 is fixed by means of a retaining collar 37 to a self-adjusting device 38 fixed to the support 1. The self-adjusting device 38 has the purpose of adjusting the length of the sheathed steel cable portion of the control cable C, that is, the sheathed cable portion included between the fixed point F and the self-adjusting device 38 itself.

Once the locking device of the invention is mounted on the vehicle, it operates as described below:

FIG. 1 shows the initial position in which the locking device operates, that is, with the lever 2 in the parking position and with the ignition key not coupled to the starter switch; in this position, on the retaining mechanism MR the retaining stem 11 is in the locked position and is coupled with the contact stem 10 which, situated in the parking position, prevents its movement, and on the securing mechanism MF the traction body 22 is in the locking position, while the projection 6 of the trigger 3 of the lever 2 is, furthermore, set between the bridge 7, the retainer 8 and the plane 27 of the traction body 22;

in this situation, if the user presses on the trigger 2 of the lever 2, its projection 6 cannot slide downwards as it is prevented from doing so by the traction body 22, which cannot rotate around the pivot pin 23 due to being prevented from doing so by the coupling of the contact 10 and retaining 11 stems, while the lever 2 cannot advance towards the drive positions due to its being prevented from doing so by the retainer 8 in which the projection 6 engages, that is, the lever 2 cannot be moved towards the drive positions and is locked;

FIG. 2 shows how, with the ignition key coupled to the starter switch, on the retaining mechanism MR the contact stem 10 is in the drive position in which its end 21 withdraws from the cavity 20 of the retaining stem 11, thereby leaving said stem 11 released and able to slide through the orifice 15 of the main body 1;

FIG. 3 shows how, with the retaining stem 11 released, when the trigger 3 of the lever 2 is pressed, its projection 6 pushes the traction body 22, making it rotate around the pivot pin 23 by overcoming the elastic resistance of the thrust spring 12 which is subjected to higher compression by reduction of its length, in which situation the spring 6, on leaving its parking position set by the retainer 8 of the bridge 7, permits rotation of the lever 2 in the direction marked A towards the vehicle driving positions;

once the lever 2 is situated in one of said driving positions, FIG. 4 shows how the lever 2 can be moved in both directions, marked as A and B, inherent to driving the vehicle;

in such a situation, the traction body 22 is in a position corresponding with that of the lever 2, and the retaining stem 11, which is moved through the interior of the main body 9, takes up positions different from the locked position;

once the vehicle is parked, in order to uncouple the ignition key from the starter switch the retaining stem 11 must be in the locked position shown in FIG. 1, thus permitting the contact stem 10 be in the parking position, in which the retaining stem is coupled;

once the ignition key in uncoupled, the locking device of the invention is left in the initial position described above.

We claim:

1. A locking device for the automatic transmission gearshift lever of automobile vehicles, comprising a reset mechanism (MR) and a securing sheathed steel cable, in which:

the reset mechanism (MR) is associated with the starter switch on the vehicle dashboard through a contact stem (10) with two working positions provided by coupling of the ignition key with the switch, a first position or parking position in which the ignition key is not coupled to the switch, and a second position or drive position in which the ignition key is coupled to the switch, characterized in that:

the reset mechanism (MR) includes a main body (9), a retained stem (11) and a thrust spring (12), in which the main body (9) houses the contact stem (10) and the retaining stem (11), both of which can slide in both directions, with the retaining stem (11) being provided with means of coupling with the contact stem (10) and, being linked by one of its ends (16) to the corresponding end (17) of the steel cable on the control cable (C), the thrust spring (12) acts permanently upon the retaining stem (11), pushing it towards the interior of the main body (9) and tending to situate it in its most advanced position, or locking position, all this in such a way that, with the contact stem (10) in the parking position and the retaining stem (11) in the locking position, both stems (10, 11) can be coupled to prevent sliding of the retaining stem (11); and the securing mechanism (MF) includes a traction body (22) coupled to the gearshift lever (2) and to the lever (2) support (1) and linked at the other end (29) of the steel cable of the control cable (C), implementing coupling of the traction body (22) with the support (1) in such a way that the traction body (22) can rotate in both directions around a pivot pin (23), the traction body (22) being coupled with the lever (2) in such a way that the position of the traction body (22) corresponds with that of the lever (2), the locking position being distinguished in that the lever (2) is in the parking position, which corresponds with the locking position of the retaining stem (11), while in a traction body (22) position different from the locking position the retaining stem (11) is in a position different from the locking position which prevents its coupling with the contact stem (10), the traction body (22) being permanently submitted to the action of the thrust spring (12) in such a way that, when the traction body (22) is moved by the lever (2) from the locking position to another position, it subjects the thrust spring (12) to higher parking position the traction body (22) is moved towards the locking position driven by the reaction of the thrust spring (12) and, the contact (10) and retaining (11) stems being coupled, the traction body (22) is fixed in the locking position end the lever (2) is fixed in the parking position, by locking of it actuation trigger (3).

2. A locking device as claimed in claim 1, characterized in that the coupling of the traction body (22) with the lever (2) is implemented by means of a stop (31) attached to the lever (2) and arranged in a slot (32) on the traction body (22) through which it can slide.

3. A locking device as claimed in claims 1 and 2, characterized in that the traction body (22) is adapted so that, when the lever (2) is in the parking position, the projection (6) from the trigger (3) of the lever (2) linked with the retainer (8) of the support (1) which sets the parking position is positioned between the support (1) and the traction body (22), in such a way that, with the contact (10) and retaining

(11) stems coupled, the projection (6) of the trigger (3) cannot be moved.

4. A locking device as claimed in claims 1 to 3, characterized in that the portion (27) of the traction body (22) facing the projection (6) of the trigger (3) of the lever (2), when the latter is in the parking position, forms a certain angularity oriented towards the other positions of the lever (2).

5. A locking device as claimed in claims 1 to 4, characterized in that the contact (10) and retaining (11) stems of the retaining mechanism are arranged orthogonally to each other, their mutual coupling being implemented by means of a cavity (20) made in the retaining stem (11) which is so dimensioned as to receive the corresponding end portion (21) of the contact stem (10).

6. A locking device as claimed in claims 1 to 5, characterized in that the thrust spring (12) is arranged coaxially with respect to the control cable (C) and works permanently under compression, with one of its ends resting against a fixed point (F) of the vehicle structure and its other end against an annular body (13) fixed coaxially to the end (17) of the steel cable linked to the retaining stem (11).

* * * * *